Patented Apr. 16, 1940

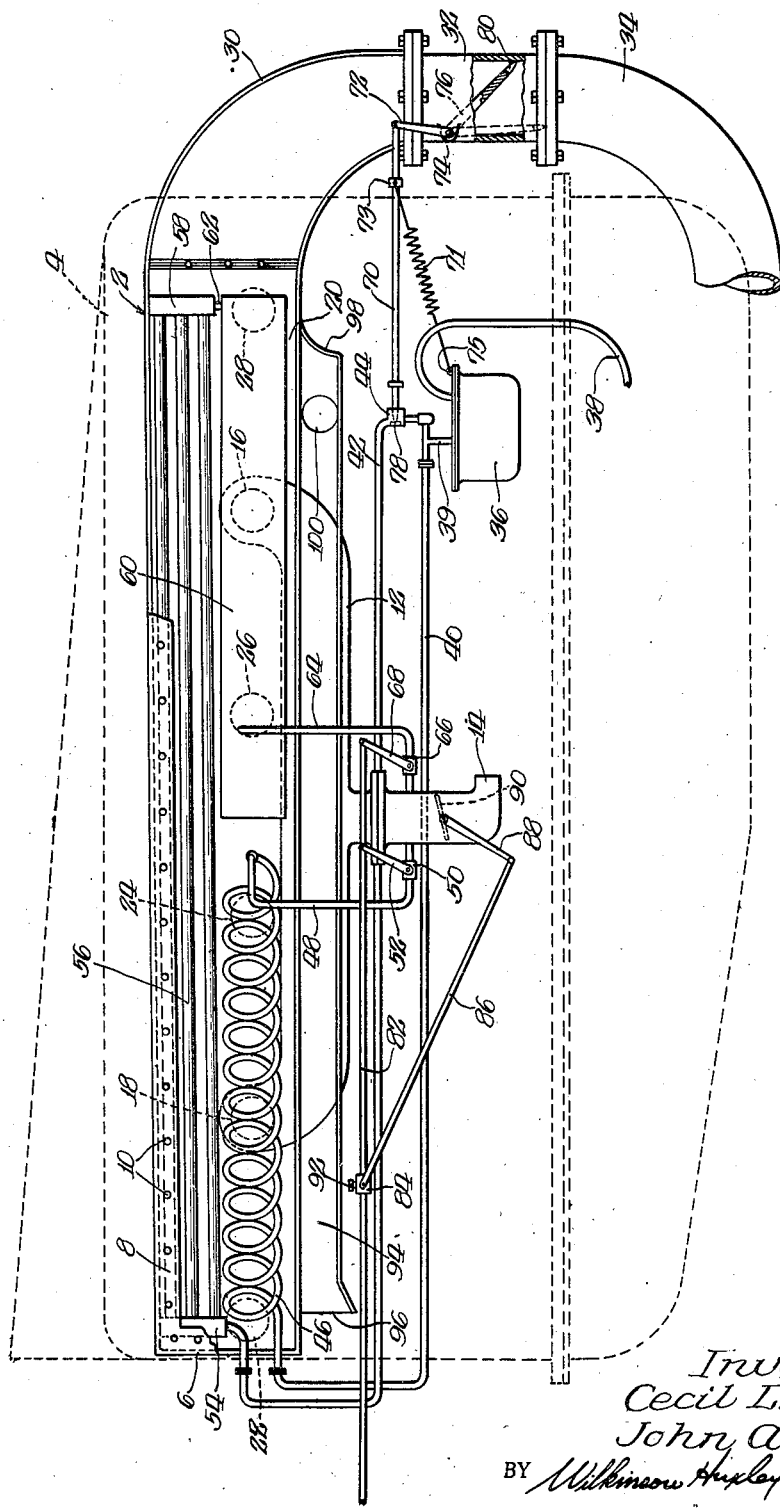

2,197,236

UNITED STATES PATENT OFFICE 2,197,236

FUEL FEEDING MEANS FOR INTERNAL COMBUSTION ENGINES AND THE LIKE

Cecil L. Bowen and John A. Bowen, Pueblo, Colo.

Application March 30, 1938, Serial No. 198,834

14 Claims. (Cl. 123—133)

The present invention relates to internal combustion engines, and more in particular to a fuel generator therefor.

Among the objects of the present invention is to provide a fuel generator for an internal combustion engine, which generator is of a simplified construction and is in heat association preferably with the exhaust of the internal combustion engine whereby the hydrocarbon fuel conveyed thereto is volatilized and properly mixed with a combustion supporting medium for operating the combustion engine.

Another object of the present invention is to provide a novel gas generator for internal combustion engines which is adapted to economically and efficiently generate hydrocarbon fuel therefor at all speeds.

More particularly, the present invention has to do with a novel gas generator for internal combustion engines, which generator comprises auxiliary and main parts in heat association with the internal combustion engine, the auxiliary unit being adapted for generating hydrocarbon fuel for initially starting the engine and to maintain uniform idling running conditions for the internal combustion engine, and the main generator unit being used for generating hydrocarbon fuel for the engine when running from idling to maximum speeds.

Still a further object of the present invention is to provide novel means in association with the fuel generating means, and more particularly connected to the main generating unit, for conditioning the gaseous hydrocarbon fuel and for maintaining uniformity of pressure in the main fuel line to the intake manifold. The invention comprehends a chamber in heat association with the engine and connected to the main generator and intake manifold, which chamber acts in the capacity of a surge tank for maintaining uniformity of pressure and mixture and for conditioning by way of a drying operation to supply dry volatile gaseous fuel to the intake manifold, this tank being adapted for use with or without the auxiliary generator.

The invention further contemplates a novel control for cutting in and out the main fuel generator from the fuel supply in accordance with the operation of the engine. Such novel control may be operated in accordance with the volume of exhaust gases from the engine, or by a positive connection with the accelerator.

Still another object within the purview of the present invention is to provide in combination with the fuel generators novel combustible control means for regulating the components, namely, gaseous hydrocarbon fuel and combustible medium being supplied to the intake for the engine.

Other objects, features, capabilities and advantages are comprehended by the invention, as will later appear and as are inherently possessed thereby.

Referring to the drawing:

The figure is a fragmentary view in side elevation of a gas generator embodying the present invention, certain parts thereof being broken away to disclose more in particular the specific arrangement of other of the parts thereof.

Referring now more in detail to the drawing, an embodiment selected to illustrate the present invention is represented generally as 2, the same being connected to an internal combustion engine casing as shown in dotted lines 4. More particularly, the novel device disclosed in the drawing is enclosed in part in a manifold housing 6, provided on the outer face with a removable plate 8 for access to the interior thereof, this plate being secured to the housing in any desired manner, as for example, by bolts 10, or the like. This manifold housing is secured to one side of the engine casing 4 and comprises in part an intake manifold 12 having an inlet 14, the same communicating with intake ports 16 and 18, each of which is adapted to supply a hydrocarbon fuel mixture to two cylinders of the engine. This housing 4 is further provided with an interior elongated chamber 20 which is in communication with exhaust ports 22, 24, 26 and 28 of the engine, one each being provided for each cylinder thereof whereby the exhaust gases are discharged into the manifold housing 6 and expelled through an elbow 30 which, through the fitting 32 connected thereto, discharges the gases into the exhaust pipe 34 also connected to the fitting 32, and which pipe extends rearwardly of the engine in the conventional manner and is connected to a muffler disposed beneath the vehicle body.

As in the conventional type of automotive internal combustion engine, the pump 36 is provided adjacent the casing 4, which fuel pump is supplied with a fuel through line 38 extending to a source of supply usually at the rear of the vehicle, this fuel pump 36 being of any desired construction and conventionally operated by means of the engine.

The present invention is directed more in particular to the generation of hydrocarbon fuel from the pump 36 for all driving operations, and the novel controls associated therewith for securing uniform operation of the internal combustion engine under all conditions without excessive consumption of such fuel and for securing maximum efficiency of the device.

It has been found that such desiderata are more closely approached if the fuel generator is formed in two parts, one of which is used as an auxiliary generating unit for starting and for idling speeds, and the other part, the main generating unit, for use in generating the hydrocarbon fuel for speeds above the idling speed.

In the illustrative example of the invention, the fuel pump 36 is provided with a conduit 39 connected to conduit 40 and to a branch conduit 42 having a needle valve 44 connected therein and which is operated under certain conditions, as will be hereinafter more fully discussed. The feed line 40 is connected to an auxiliary generator 46 in the form of a coil of some desirable metal which is highly responsive to heat conditions for quickly and efficiently volatilizing hydrocarbon fuel supplied thereto from the pump 36. This auxiliary generator is disposed within the manifold housing 6 in heat association with the exhaust gases from the engine and is relatively short in length as compared to the length of said manifold housing, the other end of the same being connected by way of a pipe or lead 48 to the intake manifold 12, this line 48 being provided with a valve 50 controlled by a lever or arm 52, as will be hereinafter more fully discussed.

The line 42 from the fuel pump 36 extends toward the rear of the casing 4 and is connected to one header 54 of the main generator, which comprises a plurality of elongated tubular members 56 connected to the header 54 at one end and to the opposite header 58 at the other end, all of which is disposed within the manifold housing 6 in heat association with the exhaust gases from the internal combustion engine which are discharged through the ports 22, 24, 26 and 28 whereby, under certain conditions, hydrocarbon fuel from the pump 36 is volatilized in its passage through the tubes 56.

Disposed within the manifold housing 6 and at the end of the auxiliary generator coil 46 is an elongated surge tank 60 connected adjacent one end thereof through the pipe 62 to the header 58 of the main fuel generator and adjacent the other end to the line 64 which is connected to the intake manifold 12, a valve 66 being provided therein for regulating the discharge of volatilized hydrocarbon fuel into said intake manifold by way of an arm or lever 68 operated as will be hereinafter more fully disclosed.

It is understood, of course, that the tank 60 is disposed within the manifold housing 6 in heat association with the exhaust gases for conditioning the gaseous hydrocarbon fuel delivered thereto from the tubes 56 of the main generator. This tank 60 providing an enlarged chamber serves to completely dry the hydrocarbon fuel delivered thereto so that when such hydrocarbon fuel is delivered to the intake manifold through the line 64, the same is in a superheated condition, which increases the efficiency of operation of the internal combustion engine. Furthermore, this tank also serves as a surge tank to assure uniform pressure of the gaseous hydrocarbon fuel delivered through the line 64 to prevent uneven or erratic operation of the engine. In this connection, the relative cross-sectional areas of the tubes 56 and the tank 60 are of such a proportion as to maintain this uniformity of pressure and to effectively and completely dry the gaseous hydrocarbon fuel to prevent delivery of gaseous hydrocarbon fuel in a wet condition to the intake manifold 12. This is an important feature of the present invention and has been found to operate effectively and efficiently under all conditions.

The valve 44, as referred to hereinbefore, is located in the supply line 42 which extends by way of the line 39 at one end to the fuel pump 36 and at its other end to the main fuel generator. The needle for this valve 44 is in the form of an elongated member 70 mounted and slidable in the casing of the valve 44 at one end and extending at is other end and being pivotally connected to an arm or lever 72 fixed to a pivot 74 in the fitting 32 of the exhaust line. Mounted upon the pivot 74 is a flap valve 76 adapted, in its normal position, to extend across the opening of the fitting 32. The seating of member 70 with valve seat 78 and the normal positioning of the flap valve 76 are obtained by way of a coil spring 71 connected at one end to the collar 73 mounted on the member 70 and at the other end to the fuel pump as at 75. When in this position the adjustment of the member 70 is such that the same is in seating relation with the valve seat 78 of the valve 44, thereby preventing flow of hydrocarbon fuel from the pump 36 to the main fuel generator by way of line 42. In other words, the flap valve 76 controls the fuel supply to the main fuel generator. This valve 76 is formed with a cut-out portion 80, preferably V-shaped, which is just sufficient to allow the escape of exhaust gases from the engine therethrough into pipe 34 when the engine is at idling speed.

It is understood, however, that if desired, valve 44 may be cut in and out by means of linkage between rod 70 and the rod 82, hereinafter more fully described.

Connected adjacent the upper end of arms or levers 52 and 68 is a rod 82 extending to the rear of the motor and which is suitably connected to the accelerator pedal on the floor of the vehicle body whereby levers 52 and 68 are operated by movement of the accelerator foot pedal. Connected to the rod 82 through block 84 is a rod 86 having its other end connected to arm or lever 88 controlling butterfly valve 90 of the intake manifold. Block 84 is adjustable on rod 82 by means of the set-screw 92 to vary the position of the butterfly valve 90 in the intake manifold and to vary the relative position of said valve and said levers 52 and 68 of the valves 50 and 66 whereby any desired proportioning of gaseous hydrocarbon fuel to the combustion supporting medium taken into the intake manifold through intake 14 may be secured.

In order to secure added efficiency of the present device and more uniform and even operation thereof, the manifold housing 6 is formed with an elongated chamber 94 opened to the rear as at 96 and closed to the front, as at 98, such chamber being provided with an opening 100 to which is connected a flexible hose connection or tubing (not disclosed) extending and being connected to the intake 14 whereby the combustion supporting medium for the gaseous hydrocarbon fuel is in a preheated state, it being understood, of course, that the air in chamber 94 is in heat association with the exhaust gases of the internal combustion engine.

For the purpose of describing the operation of the present device, assume that the motor is cold when the operator steps on the starter to turn the same over for starting. Upon turning over of the motor, the pump 36 is operated to draw fuel from the line 38 and to discharge the same through line 40 to the auxiliary generator coil 46, it being clearly understood that at this time the flap valve 76 is in the position shown because of the fact that no pressure is built up on the motor side thereof by the exhaust gases. The auxiliary coil generator 46 immediately supplies gas to the intake manifold 12, which gas is sucked by vacuum from the motor into the intake ports 16 and 18. As the motor warms up the exhaust gases surrounding the generator coil 46 more efficiently volatilize the hydrocarbon fuel to provide for smoother operation of the engine during its idling period. This initial starting of course heats the generator tubes 56 of the main generator so that the hydrocarbon fuel which may be disposed therein at the time that the motor was last shut off will be volatilized and in a condition to be discharged into the intake manifold when the conditions are such that fuel to be fed therefrom is desired. During this idling period the flap valve 76 maintains its normal position, as shown in full lines, in view of the fact that no pressure is built up on the engine side thereof due to the escape of exhaust gases through the opening 80.

This motor can be operated under idling conditions as long as it is desired, but when the operator steps upon the accelerator pedal, rod 82 is moved to the right, as shown in the figure, to feed a greater amount of gas to the engine, increasing its speed, which at the same time because of the excess volume of exhaust gases, builds up pressure on the motor side of flap valve 76 to open the same, which in turn opens valve 44 through the needle member 70. Increased speed of operation of the motor affects the pump 36 so that a greater amount of hydrocarbon fuel is supplied through the line 42 to the main generator tubes 56. This fuel is immediately volatilized in passing through the tubes and is finally discharged into the surge or conditioning tank 60 whereby the same is supplied through line 64 and valve 66 which is opened to the intake manifold 12.

Where it is found desirable to positively connect valve 44 with rod 82 by means of linkage, valve 44 is opened to supply the main generator upon speeding up of the motor by movement of rod 82.

It will therefore be quite apparent from the above description of the operation of the device that under idling speeds, say up to 15 or 20 miles, that the auxiliary coil generator 46 will supply the fuel requirements for the engine, but that after such speed has been passed, the main generator is ut in through valve 44 to supply a greater quantity of hydrocarbon fuel for proper operation of the engine. This auxiliary coil has been found to be highly advantageous in a device of this kind inasmuch as the same is relatively small in cross-sectional area as compared to the main generator unit and is more responsive to heat of the exhaust gases (because of its material and wall thickness) so that more effective volatilization is secured in said auxiliary coil than could be obtained in the main generator. This also assists in starting the motor in that if reliance were placed upon the main generator in the starting operation, slugs of raw gasoline would be supplied to the motor which would not only cause the motor to run erratic during idling speeds, but would be highly wasteful. With the present combination, however, of auxiliary and main generator units, any desired speed of operation can be obtained with smooth running of the engine and with economical consumption of the hydrocarbon fuel.

While we have herein described and upon the drawing shown an illustrative embodiment of the invention, it is to be understood that the invention is not limited thereto but may comprehend other constructions, arrangements of parts, details and features without departing from the spirit of the invention.

We claim:

1. In an internal combustion engine, the combination of a manifold housing, means associated with said housing providing intake and exhaust manifolds for said engine, a fuel supply, a fuel generator means connected to said supply and said intake manifold and being in heat transfer association with said manifold housing, said last-named means including a fuel conditioning chamber, an air passage in heat association with said housing, and means connecting said air passage with said intake manifold.

2. In an internal combustion engine, the combination of a manifold housing having means providing an intake and an exhaust manifold for said engine, a fuel supply, a fuel generator means connected to said supply and said intake manifold and disposed within said housing, said last-named means including a fuel conditioning chamber disposed within said housing, and said housing having a passage communicating at one end exteriorly thereof and adjacent the other end having means communicating with said intake manifold.

3. In an internal combustion engine, the combination of a manifold housing, means associated with said housing providing intake and exhaust manifolds for said engine, a fuel supply, and main and auxiliary fuel generator means connected to said supply and being in heat association with said housing, said main fuel generator means including a fuel conditioning chamber.

4. In an internal combustion engine, the combination of a manifold housing having means providing an intake and an exhaust manifold for said engine, a fuel supply, a main and auxiliary fuel generator means connected to said supply and said intake manifold and disposed within said housing, and means controlled by the exhaust from said exhaust manifold for controlling the fuel supply to said main and auxiliary fuel generators.

5. In an internal combustion engine, the combination of a manifold housing having means providing an intake and an exhaust manifold for said engine, a fuel supply, a main and auxiliary fuel generator means connected to said supply and said intake manifold and disposed within said housing, said main fuel generator including a fuel conditioning chamber, and means for controlling the fuel supply to said main and auxiliary fuel generators.

6. In an internal combustion engine, the combination of a manifold housing having means providing an intake and an exhaust manifold for said engine, a fuel supply, a main and auxiliary fuel generator means connected to said supply and said intake manifold and disposed within said housing, said main fuel generator including a fuel conditioning chamber, and means controlled by the exhaust from said exhaust manifold for controlling the fuel supply to said main and auxiliary fuel generators.

7. In an internal combustion engine, the combination of a manifold housing having means providing an intake and an exhaust manifold for said engine, a fuel supply, a main and auxiliary fuel generator means connected to said supply and said intake manifold and disposed within said housing, and said housing having a passage communicating at one end exteriorly thereof and adjacent the other end having means communicating with said intake manifold, and means controlled by the exhaust from said exhaust manifold for controlling the fuel supply to said main and auxiliary fuel generators.

8. In an internal combustion engine, the combination of a manifold housing having means providing an intake and an exhaust manifold for said engine, control means for said intake manifold, a fuel supply, a main and auxiliary fuel generator means connected to said supply and said intake manifold and disposed within said housing, control means for said main and auxiliary fuel generator means for controlling discharge of fuel into said intake manifold and interconnected with said intake control means, and means for controlling the fuel from said supply to said main fuel generator means, said last-named means being operatively connected to said first-named control means.

9. In an internal combustion engine, the combination of a manifold housing having means providing an intake and an exhaust manifold for said engine, control means for said intake and said exhaust manifold, a fuel supply, a main and auxiliary fuel generator means connected to said supply and said intake manifold and disposed within said housing, said main and auxiliary fuel generator means including an elongated and a coil tubing, respectively, control means for said main and auxiliary fuel generator means for controlling discharge of fuel into said intake manifold and interconnected with said intake control means, and means for controlling the fuel from said supply to said main fuel generator means, said last-named means being operated by said exhaust control means.

10. In an internal combustion engine, the combination of a manifold housing having means providing an intake and an exhaust manifold for said engine, control means for said intake and said exhaust manifold, a fuel supply, a main and auxiliary fuel generator means connected to said supply and said intake manifold and disposed within said housing, said main fuel generator means including a fuel conditioning chamber, control means for said main and auxiliary fuel generator means for controlling discharge of fuel into said intake manifold and interconnected with said intake control means, and means for controlling the fuel from said supply to said main fuel generator means, said last-named means being operated by said exhaust control means.

11. In an internal combustion engine, the combination of a manifold housing having means providing an intake and an exhaust manifold for said engine, control means for said intake and said exhaust manifold, a fuel supply, a main and auxiliary fuel generator means connected to said supply and said intake manifold and disposed within said housing, said main and auxiliary fuel generator means including an elongated and a coil tubing, respectively, said main fuel generator means including a fuel conditioning chamber, control means for said main and auxiliary fuel generator means for controlling discharge of fuel into said intake manifold and interconnected with said intake control means, and means for controlling the fuel from said supply to said main fuel generator means, said last-named means being operated by said exhaust control means.

12. In an internal combustion engine, the combination of a manifold housing having means providing an intake and an exhaust manifold for said engine, control means for said intake and said exhaust manifold, a fuel supply, a main and auxiliary fuel generator means connected to said supply and said intake manifold and disposed within said housing, said housing having a passage communicating at one end exteriorly thereof and adjacent the other end having means communicating with said intake manifold, control means for said main and auxiliary fuel generator means for controlling discharge of fuel into said intake manifold and interconnected with said intake control means, and means for controlling the fuel from said supply to said main fuel generator means, said last-named means being operated by said exhaust control means.

13. In an internal combustion engine, the combination of a manifold housing having means providing an intake and an exhaust manifold for said engine, valves disposed in said intake and exhaust manifolds, a fuel pump, a main and auxiliary fuel generator means comprising a plurality of elongated tubes and a coil tube, respectively, connected to said pump and to said intake manifold and disposed in said housing, valves for said main and auxiliary fuel generator means for controlling discharge of fuel into said intake manifold, an accelerator rod connected to said last-named valves and adjustably connected to the valve in said intake manifold, said housing having a passage communicating at one end exteriorly thereof and adjacent the other end having means communicating with said intake manifold, and a valve in said main fuel generator means for controlling flow of fuel from said pump thereto, and means connecting said last-named valve and the valve for said exhaust manifold.

14. In an internal combustion engine, the combination of a manifold housing having means providing an intake and an exhaust manifold for said engine, valves disposed in said intake and exhaust manifolds, a fuel pump, a main and auxiliary fuel generator means comprising a plurality of elongated tubes and a coil tube, respectively, connected to said pump and to said intake manifold and disposed in said housing, said main fuel generator means including a fuel conditioning chamber, valves for said main and auxiliary fuel generator means for controlling discharge of fuel into said intake manifold, an accelerator rod connected to said last-named valves and adjustably connected to the valve in said intake manifold, said housing having a passage communicating at one end exteriorly thereof and adjacent the other end having means communicating with said intake manifold, and a valve in said main fuel generator means for controlling flow of fuel from said pump thereto, and means connecting said last-named valve and the valve for said exhaust manifold.

CECIL L. BOWEN.
JOHN A. BOWEN.